US011995867B2

(12) United States Patent
Li (10) Patent No.: US 11,995,867 B2
(45) Date of Patent: May 28, 2024

(54) METHOD AND APPARATUS FOR IMAGING CALIBRATION, AND DUAL-LIGHT CAMERA

(71) Applicant: AUTEL ROBOTICS CO., LTD., Guangdong (CN)

(72) Inventor: Zhaozao Li, Guangdong (CN)

(*) Notice: Subject to any disclaimer, the term of this patent is extended or adjusted under 35 U.S.C. 154(b) by 157 days.

(21) Appl. No.: 17/652,388

(22) Filed: Feb. 24, 2022

(65) Prior Publication Data

US 2022/0292719 A1 Sep. 15, 2022

Related U.S. Application Data

(63) Continuation of application No. PCT/CN2020/123371, filed on Oct. 23, 2020.

(30) Foreign Application Priority Data

Aug. 29, 2019 (CN) .......................... 201910807078.7

(51) Int. Cl.
*G06T 5/90* (2024.01)
*G06F 17/11* (2006.01)
(Continued)

(52) U.S. Cl.
CPC ................ *G06T 7/85* (2017.01); *G06F 17/11* (2013.01); *G06T 5/70* (2024.01); *G06T 5/90* (2024.01);
(Continued)

(58) Field of Classification Search
CPC ........... G06T 7/85; G06T 5/002; G06T 5/007; G06T 7/13; G06T 7/70;
(Continued)

(56) References Cited

U.S. PATENT DOCUMENTS

| 2016/0196653 A1* | 7/2016 | Grant ..................... H04N 23/45 |
| | | 382/294 |
| 2016/0295208 A1* | 10/2016 | Beall ...................... H04N 23/11 |
| 2017/0134713 A1 | 5/2017 | Lin et al. |

FOREIGN PATENT DOCUMENTS

| CN | 104574332 A | 4/2015 |
| CN | 106971385 A | 7/2017 |

(Continued)

OTHER PUBLICATIONS

International Search Report dated Feb. 1, 2021; PCT/CN2020/123371.

*Primary Examiner* — John W Miller
*Assistant Examiner* — Humam M Satti
(74) *Attorney, Agent, or Firm* — Frank Gao, esq.

(57) ABSTRACT

Embodiments of the present invention discloses an imaging calibration method and apparatus for a dual-light camera and a dual-light camera. A thermal imaging image including a first calibration frame image and a visible light image including a second calibration frame image are acquired. The first calibration frame image and the second calibration frame image are images of a same calibration frame respectively photographed by a thermal imaging camera and a visible light camera. First position information of the first calibration frame image in the thermal imaging image and second position information of the second calibration frame in the visible light image are acquired. Calibration parameters are generated according to the first position information and the second position information. A position of the thermal imaging image synthesized in the visible light image in the visible light image is adjusted according to the calibration parameters.

15 Claims, 4 Drawing Sheets

(51) Int. Cl.
  *G06T 5/70*    (2024.01)
  *G06T 7/13*    (2017.01)
  *G06T 7/70*    (2017.01)
  *G06T 7/80*    (2017.01)

(52) U.S. Cl.
  CPC ............... *G06T 7/13* (2017.01); *G06T 7/70* (2017.01); *G06T 2207/10048* (2013.01)

(58) Field of Classification Search
  CPC . G06T 2207/10048; G06T 2207/10004; G06T 2207/30204; G06T 7/80; G06T 7/33; G06T 7/30; G06T 2207/10032; G06T 7/73; G06F 17/11; B64U 2101/30; H04N 17/002
  See application file for complete search history.

(56) References Cited

FOREIGN PATENT DOCUMENTS

| | | |
|---|---|---|
| CN | 108550104 A | 9/2018 |
| CN | 110519498 A | 11/2019 |

* cited by examiner

METHOD AND APPARATUS FOR IMAGING CALIBRATION, AND DUAL-LIGHT CAMERA

CROSS REFERENCE

The present application is a continuation of International Application No. PCT/CN2020/123371, filed on Oct. 23, 2020, which claims priority to Chinese patent application No. 2019108070787, filed on Aug. 29, 2019, which is incorporated herein by reference in its entirety.

TECHNICAL FIELD

The present invention relates to the field of aerial camera technologies, and in particular, to an imaging calibration method and apparatus for a dual-light camera and a dual-light camera.

BACKGROUND

An unmanned aerial vehicle (UAV) is an unmanned aircraft operated by a radio remote control device and a self-provided program control terminal. The UAV involves sensor technologies, communication technologies, information processing technologies, intelligent control technologies, power propulsion technologies and the like, and is a high-tech product in the information age.

Industrial UAVs are often used in industrial sites. To meet the needs of work in fields such as power monitoring, petrochemical, crop fields and forest fields, the industrial UAVs often carry dual-light cameras. A common dual-light camera is a combination of a thermal imaging camera and a visible light camera, which can simultaneously record and transmit a thermal imaging image and a visible light image. However, the dual-light camera adopts two sensors or cameras. The two sensors or cameras have a relative physical displacement between different orientations or positions. Alignment of formed images is especially important if two separate images or video streams captured by the dual-light camera are to be combined for display, fused for display or seamlessly connected for display. Traditionally, registration or alignment of such separately captured images or video streams is achieved by mechanically aligning a position and an angle between the sensors or cameras, which, however, causes manufacturing of optics and imaging sensors to be extremely expensive and demanding. Moreover, it cannot be guaranteed that such alignment is strictly unchanged during use.

Therefore, there is a need for a simple and easy-to-operate calibration method that enables the dual-light camera or multi-sensor imaging to be independent of a physical displacement and an angle, so that images photographed by two or more cameras or sensors can be combined, fused or seamlessly connected for display.

SUMMARY

Embodiments of the present invention provide an imaging calibration method and apparatus for a dual-light camera and a dual-light camera, to not only effectively implement fine calibration before delivery from a factory, but also resolve the problem that formed images cannot be fused or seamlessly connected due to a physical displacement or deformation of a dual-light photographing structure or a camera lens caused by long-term use.

According to one aspect of the embodiments of the present invention, an imaging calibration method for a dual-light camera is provided, applicable to a dual-light camera, the dual-light camera including a thermal imaging camera and a visible light camera, the method including: acquiring a thermal imaging image including a first calibration frame image and a visible light image including a second calibration frame image, where the first calibration frame image and the second calibration frame image are images of a same calibration frame respectively photographed by the thermal imaging camera and the visible light camera; acquiring first position information of the first calibration frame image in the thermal imaging image and second position information of the second calibration frame in the visible light image, where the first position information includes a width, a height and coordinates of the first calibration frame image in the thermal imaging image, and the second position information includes a width, a height and coordinates of the second calibration frame in the visible light image; generating calibration parameters according to the first position information and the second position information, where the calibration parameters include a width, a height and coordinates of a thermal imaging image synthesized in the visible light image; and adjusting, according to the calibration parameters, a position of the thermal imaging image synthesized in the visible light image in the visible light image.

Optionally, the calibration frame is a rectangular heating frame.

Optionally, the acquiring first position information of the first calibration frame image in the thermal imaging image and second position information of the second calibration frame in the visible light image includes: performing image processing on the thermal imaging image and the visible light image respectively; and extracting, by using an edge detection algorithm, edges of the thermal imaging image and the visible light image after the image processing, so as to obtain the first position information and the second position information.

Optionally, the image processing includes at least one of image denoising or contrast enhancement.

Optionally, the generating calibration parameters according to the first position information and the second position information includes:

generating the calibration parameters by using the following formulas:

$$w = \frac{w_r w_1}{w_0}, h = \frac{h_r h_1}{h_0}, x = x_1 - \frac{w_1 x_0}{w_0}, y = y_1 - \frac{h_1 y_0}{h_0}$$

where w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible light image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

According to another aspect of the embodiments of the present invention, a dual-light camera is provided, including:

a thermal imaging camera, configured to acquire a thermal imaging image including a first calibration frame image;

a visible light camera, configured to acquire a visible light image including a second calibration frame image, where the first calibration frame image and the second calibration frame image are images of a same calibration frame respectively photographed by the thermal imaging camera and the visible light camera; and a processor, communicably connected to the thermal imaging camera and the visible light camera, where the processor is configured to:

acquire first position information of the first calibration frame image in the thermal imaging image and second position information of the second calibration frame in the visible light image, where the first position information includes a width, a height and coordinates of the first calibration frame image in the thermal imaging image, and the second position information includes a width, a height and coordinates of the second calibration frame in the visible light image;

generate calibration parameters according to the first position information and the second position information, where the calibration parameters include a width, a height and coordinates of a thermal imaging image synthesized in the visible light image; and adjust, according to the calibration parameters, a position of the thermal imaging image synthesized in the visible light image in the visible light image.

In an embodiment of the present invention, the processor is further configured to:

perform image processing on the thermal imaging image and the visible light image respectively; and extract, by using an edge detection algorithm, edges of the thermal imaging image and the visible light image after the image processing, so as to obtain the first position information and the second position information.

In an embodiment of the present invention, the image processing includes at least one of image denoising or contrast enhancement.

In an embodiment of the present invention, the processor is configured to:

generate the calibration parameters by using the following formulas:

$$w = \frac{w_r w_1}{w_0}, h = \frac{h_r h_1}{h_0}, x = x_1 - \frac{w_1 x_0}{w_0}, y = y_1 - \frac{h_1 y_0}{h_0}$$

where w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible light image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

According to another aspect of the embodiments of the present invention, a computer-readable storage medium is provided, where the computer-readable storage medium stores one or more programs, the one or more programs being executed by one or more processors to implement the imaging calibration method for a dual-light camera as described above.

According to still another aspect of the embodiments of the present invention, an imaging calibration apparatus for a dual-light camera is provided, including:

an image acquisition module, configured to acquire a thermal imaging image including a first calibration frame image and a visible light image including a second calibration frame image, where the first calibration frame image and the second calibration frame image are respectively images of a same calibration frame acquired by the image acquisition module;

a position acquisition module, configured to acquire first position information of the first calibration frame image in the thermal imaging image and second position information of the second calibration frame in the visible light image, where the first position information includes a width, a height and coordinates of the first calibration frame image in the thermal imaging image, and the second position information includes a width, a height and coordinates of the second calibration frame in the visible light image;

a calibration module, configured to generate calibration parameters according to the first position information and the second position information, where the calibration parameters include a width, a height and coordinates of a thermal imaging image synthesized in the visible light image; and a position adjustment module, configured to adjust, according to the calibration parameters, a position of the thermal imaging image synthesized in the visible light image in the visible light image.

Optionally, the calibration frame is a rectangular heating frame.

Optionally, the position acquisition module is further configured to perform the following steps: performing image processing on the thermal imaging image and the visible light image respectively; and extracting, by using an edge detection algorithm, edges of the thermal imaging image and the visible light image after the image processing, so as to obtain the first position information and the second position information.

Optionally, the image processing includes at least one of image denoising or contrast enhancement.

Optionally, the calibration module is further configured to:

generate the calibration parameters according to the first position information and the second position information, including: generating the calibration parameters by using the following formulas:

$$w = \frac{w_r w_1}{w_0}, h = \frac{h_r h_1}{h_0}, x = x_1 - \frac{w_1 x_0}{w_0}, y = y_1 - \frac{h_1 y_0}{h_0}$$

where w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible light image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

The embodiments of the present invention provide an imaging calibration method and apparatus for a dual-light camera, a computer-readable storage medium, and a dual-light camera. A thermal imaging image including a first calibration frame image and a visible light image including a second calibration frame image are acquired. The first calibration frame image and the second calibration frame image are images of a same calibration frame respectively photographed by the thermal imaging camera and the visible light camera. First position information of the first calibration frame image in the thermal imaging image and second position information of the second calibration frame in the visible light image are acquired. The first position information includes a width, a height and coordinates of the first calibration frame image in the thermal imaging image. The second position information includes a width, a height and coordinates of the second calibration frame in the visible light image. Calibration parameters are generated according to the first position information and the second position information. The calibration parameters include a width, a height and coordinates of a thermal imaging image synthesized in the visible light image. A position of the thermal imaging image synthesized in the visible light image in the visible light image is adjusted according to the calibration parameters. The problem of inaccurate fusion of a dual-light camera due to a relative physical distance between different sensors is resolved. The calibration method is simple and convenient. The effect of dual-light imaging display is improved.

BRIEF DESCRIPTION OF THE DRAWINGS

Accompanying drawings described herein are used for providing further understanding about the embodiments of the present invention, and constitute one portion of the present invention. Exemplary embodiments of the present invention and descriptions thereof are used for explaining the present invention, and do not constitute an inappropriate limitation on the present invention. In the accompanying drawings.

DETAILED DESCRIPTION

To make the objectives, technical solutions, and advantages of the present invention clearer, the following describes the embodiments of the present invention in detail with reference to the accompanying drawings. It should be noted that, provided that no conflict is caused, the embodiments in the present invention or the features in the embodiments may be mutually combined. In addition, although functional module division is performed in the schematic diagram of the apparatus, and a logical sequence is shown in the flowchart, in some cases, the shown or described steps may be performed by using module division different from the module division in the schematic diagram of the apparatus, or in a sequence different from the sequence in the flowchart.

Figure 1:
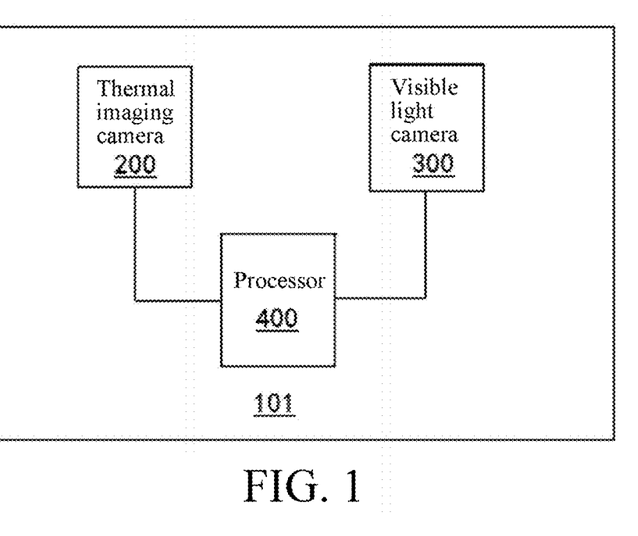
FIG. 1 is a schematic structural diagram of a dual-light camera according to an embodiment of the present invention.

FIG. 1 is a schematic structural diagram of a dual-light camera 101. In an embodiment of the present invention, the dual-light camera 101 includes a thermal imaging camera 200, a visible light camera 300 and a processor 400. Both the thermal imaging camera 200 and the visible light camera 300 are communicably connected to the processor 400.

In an embodiment of the present invention, the thermal imaging camera 200 of the dual-light camera 101 is configured to photograph a thermal radiation image of a target object, and the visible light camera 300 is configured to photograph a visible light wavelength range image of the target object.

A thermal imaging image photographed by the thermal imaging camera 200 and a visible light image photographed by the visible light camera 300 are fused in a picture-in-picture manner to form a dual-light image. After the thermal imaging image and the visible light image are combined according to a specific ratio, calibration is required. Generally, the calibration may be performed using a calibration frame.

The calibration frame is artificially selected. An object selected as the calibration frame needs to have a definite shape and have a uniform heating region overlapping a visible light region. This is to ensure that a heating part and a visible light part are consistent, so that calibration frame images respectively photographed by the thermal imaging camera and the visible light camera are the same except for pixel sizes, scale sizes or colors that may be different. If heating is uneven or only a specific region heats, a calibration frame image in an image acquired by the thermal imaging camera is completely different from a calibration frame image in an image acquired by the visible light camera. In this case, since variables cannot be controlled, the calibration frame cannot achieve a reference effect as a calibration frame. Therefore, the calibration frame needs to have a definite shape and a heating region overlapping a visible light region. Therefore, in an embodiment of the present invention, the calibration frame is a rectangular heating frame. In addition, each edge of the calibration frame is parallel to a corresponding edge of the thermal imaging image and a corresponding edge of the visible light image. Moreover, the larger the area ratio of the calibration frame occupied by the thermal imaging image, the more accurate the calibration result.

In a practical situation, for example, in factory automatic calibration, a factory-made frame with a high temperature and a heating region overlapping a visible light region is configured as a calibration frame. A factory has a dedicated calibration wall. The calibration wall is perpendicular to optical axes of the thermal imaging camera and the visible light camera. In addition, the wall has single brightness, a single color, and a consistent temperature. A temperature of the calibration frame is higher than a temperature of the calibration wall (for example, the calibration wall does not heat). The calibration frame is placed in front of the calibration wall and photographed into images.

During user-friendly automatic calibration, a uniform heating source, such as a computer display screen, can be used as a calibration frame. The calibration frame is placed in front of a wall with a single color and a uniform temperature (for example, a white indoor wall), and is photographed with the thermal imaging camera and the visible light camera simultaneously.

In an embodiment of the present invention, after the calibration frame is selected and configured, the thermal imaging camera 200 acquires a thermal imaging image including a first calibration frame image, and the visible light camera 300 acquires a visible light image including a second calibration frame image. The first calibration frame image and the second calibration frame image are images of a same calibration frame respectively photographed by the thermal imaging camera and the visible light camera.

In an embodiment of the present invention, the processor 400 of the dual-light camera 101 is further configured to acquire first position information of the first calibration frame image in the thermal imaging image and second position information of the second calibration frame in the visible light image.

The thermal imaging camera 200 sends the thermal imaging image including the first calibration frame image to the processor 400, and the processor 400 acquires first position information of the first calibration frame image in the thermal imaging image. The first position information includes a width, a height and coordinates of the first calibration frame image in the thermal imaging image.

Similarly, the visible light camera 300 sends the visible light image including the second calibration frame image to the processor 400, and the processor 400 acquires second position information of the second calibration frame image in the visible light image. The second position information includes a width, a height and coordinates of the second calibration frame image in the visible light image.

The foregoing thermal imaging image and visible light image are subjected to image processing, such as denoising and contrast enhancement, and then, is subjected to edge extraction. In the process of edge extraction, the first position information and the second position information can be obtained. In an embodiment of the present invention, the edge extraction can be implemented by using a mature edge detection extraction operator (Canny operator).

Figure 2:
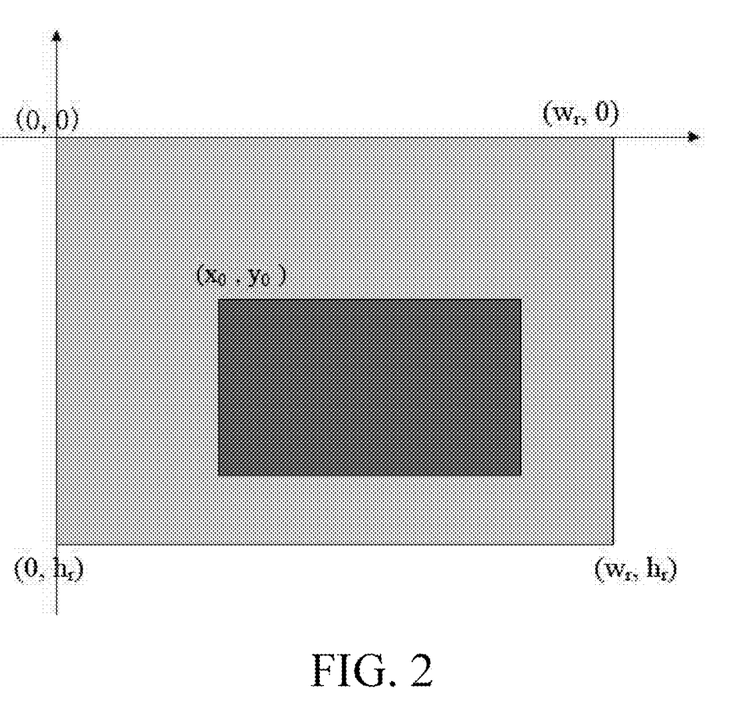
FIG. 2 is a schematic diagram of coordinates of a thermal imaging image including a first calibration frame image acquired by a thermal imaging camera in a dual-light camera according to an embodiment of the present invention.

In an embodiment of the present invention, as shown in FIG. 2, using a rectangular calibration frame as an example, if an upper left vertex of the thermal imaging image is set as an origin (0, 0), it is known that coordinates of the other three vertices of the entire image are $(w_r, 0)$, $(w_r, h_r)$ and $(0, h_r)$ clockwise in turn. $h_r-0=h_r$ is a height of the thermal imaging image. $w_r-0=w_r$ is a width of the thermal imaging image. Image recognition is performed. The thermal imaging image is subjected to denoising and contrast enhancement and then is subjected to edge extraction. Edge points are connected to form an edge graph, so that coordinates of vertices of the calibration frame are obtained. Further, a width and a height of the calibration frame can be obtained according to distances between the coordinates. Therefore, the processor 400 obtains coordinates $(x0, y0)$ of an upper left vertex, coordinates $(x0r, y0)$ of an upper right corner and coordinates $(x0, y0b)$ of a lower left corner of the calibration frame, and at the same time, calculates a width $w_0=x_{0r}-x_0$ of the first calibration frame image in the thermal imaging image and a height $h_0=y_{0b}-y_0$ of the first calibration frame image in the thermal imaging image.

Figure 3:
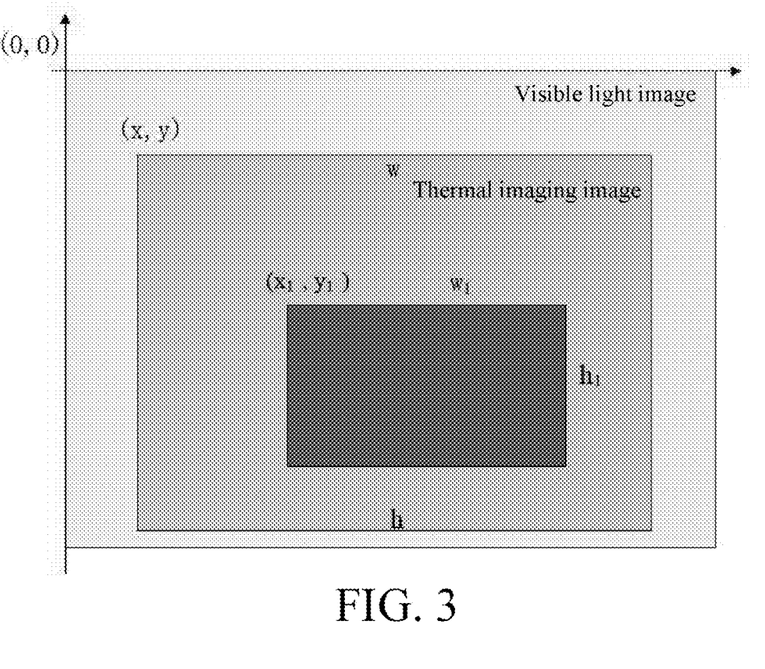
FIG. 3 is a schematic diagram of coordinates of a visible light image including a second calibration frame image acquired by a visible light camera in a dual-light camera according to an embodiment of the present invention.

In an embodiment of the present invention, as shown in FIG. 3, by way of example and not limitation, an upper left vertex of the visible light image is set as an origin (0, 0). Image recognition is performed. For example, the visible light image is subjected to denoising, contrast enhancement and edge extraction. Edge points are connected to form an edge graph (a process of image recognition in the related art is not specifically described in the present invention). Finally, coordinates of vertices of the calibration frame are obtained. Further, a width and a height can be obtained through subtraction between the coordinates. Therefore, for example, coordinates $(x_1, y_1)$ of an upper left vertex, coordinates $(x_{1r}, y_1)$ of an upper right corner and coordinates $(x_1, y_{1b})$ of a lower left corner of the calibration frame in the visible light image are obtained. A width $w_1=x_{1r}-x_1$ of the second calibration frame image in the visible light image and a height $h_1$ $y_{1b}-y_1$ of the second calibration frame image in the visible light image are calculated.

In an embodiment of the present invention, after first position information and second position information are acquired, the processor 400 generates calibration parameters according to the first position information and the second position information. The calibration parameters include a width, a height and coordinates of a thermal imaging image synthesized in the visible light image.

Using coordinates in FIG. 2 and FIG. 3 as an example, the calibration parameters include coordinates of an upper left vertex of the thermal imaging image synthesized in the visible light image, and a width and a height of the thermal imaging image. It is assumed that the coordinates of the upper left vertex of the thermal imaging image synthesized in the visible light image are (x, y), the width is w and the height is h. Because the ratio between the calibration frame and the entire thermal imaging image is constant, there are:

$$\frac{w}{w_1} = \frac{w_r}{w_0} => w = \frac{w_r w_1}{w_0} \quad (1)$$

$$\frac{h}{h_1} = \frac{h_r}{h_0} => h = \frac{h_r h_1}{h_0} \quad (2)$$

$$\frac{x_1 - x}{w_1} = \frac{x_0}{w_0} => x = x_1 - \frac{w_1 x_0}{w_0} \quad (3)$$

$$\frac{y_1 - y}{h_1} = \frac{y_0}{h_0} => y = y_1 - \frac{h_1 y_0}{h_0} \quad (4)$$

Therefore, the calibration parameters—a width w, a height h and coordinates of an upper left vertex (x, y) of the thermal imaging image synthesized in the visible light image—can be obtained. In addition, coordinates of other vertices can further be calculated, which are (x+w, y), (x+w, y+h) and (x, y+h) clockwise in turn.

After the calibration parameters are acquired, the processor 400 may adjust, according to the calibration parameters, a position of the thermal imaging image synthesized in the visible light image in the visible light image.

Figure 4:
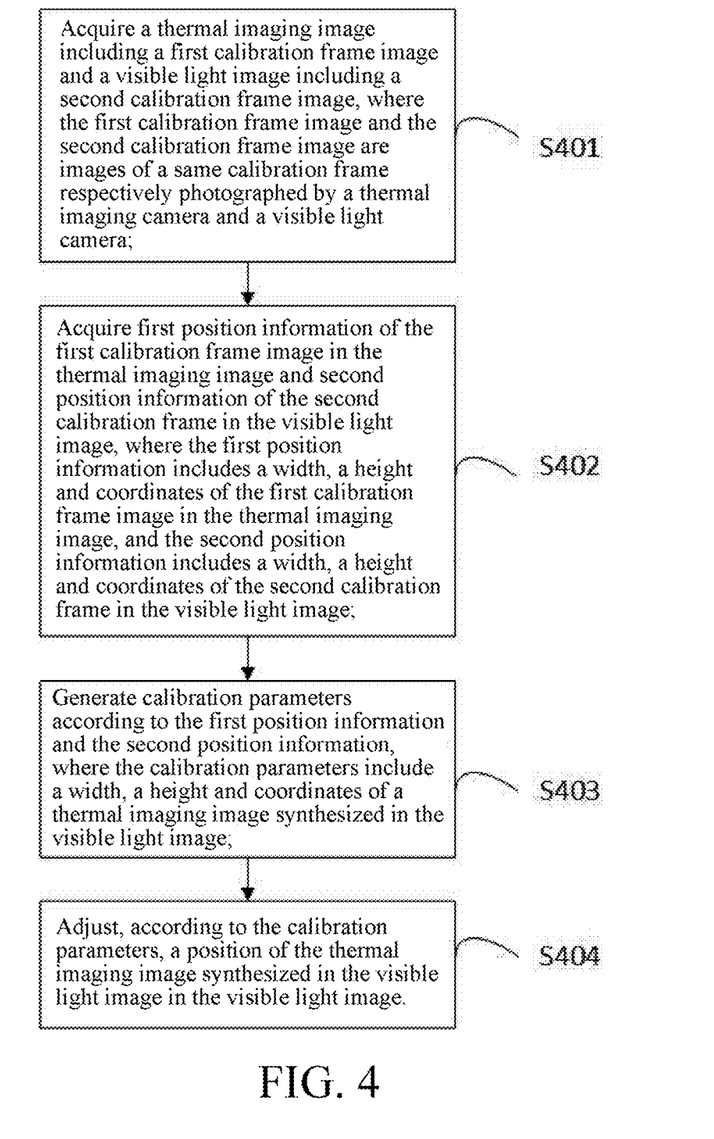
FIG. 4 is a schematic flowchart of an imaging calibration method for a dual-light camera according to an embodiment of the present invention.

FIG. 4 is a schematic flowchart of an imaging calibration method for a dual-light camera according to an embodiment of the present invention. The method is performed by a dual-light camera. The dual-light camera includes a thermal imaging camera and a visible light camera. The method includes the following steps:

Step S401: Acquire a thermal imaging image including a first calibration frame image and a visible light image including a second calibration frame image, where the first calibration frame image and the second calibration frame image are images of a same calibration frame respectively photographed by the thermal imaging camera and the visible light camera;

A thermal imaging image photographed by the thermal imaging camera 200 and a visible light image photographed by the visible light camera 300 are fused in a picture-in-picture manner to form a dual-light image. After the thermal imaging image and the visible light image are combined according to a specific ratio, calibration is required. Generally, the calibration may be performed using a calibration frame.

The calibration frame is artificially selected.

an object selected as the calibration frame needs to have a definite shape and a heating region overlapping a visible light region. This is to ensure that a heating part and a visible light part are consistent, so that a first calibration frame image and a second calibration frame image photographed by the thermal imaging camera and the visible light camera are the same except for pixel sizes, scale sizes or colors that may be different. If heating is uneven or only a specific region heats, a calibration frame image in an image acquired by the thermal imaging camera is completely different from a calibration frame image in an image acquired by the visible light camera. In this case, since variables cannot be controlled, the calibration frame cannot achieve a reference effect as a calibration frame. Therefore, the calibration frame needs to have a definite shape and a heating region overlapping a visible light region. In an embodiment of the present invention, the calibration frame is a rectangular heating frame. Each edge of the calibration frame is parallel to a corresponding edge of the thermal imaging image and a corresponding edge of the visible light image. Moreover, the larger the area ratio of the calibration frame occupied by the thermal imaging image, the more accurate the calibration result.

In a practical situation, for example, in factory automatic calibration, a factory-made frame with a high temperature and a heating region overlapping a visible light region is configured as a calibration frame. A factory has a dedicated calibration wall. The calibration wall is perpendicular to two cameras. In addition, the wall has single brightness, a single color, and a consistent temperature. A temperature of the calibration frame is higher than a temperature of the calibration wall. The calibration frame is disposed in front of the calibration wall. A thermal imaging image including a first calibration frame image and a visible light image including a second calibration frame image are respectively acquired.

During user-friendly automatic calibration, a uniform heating source that exists and is readily available in a user's life, such as a computer display screen, is configured as the calibration frame. After the dual-light camera is aligned with the calibration frame, the user presses an automatic calibration button of a control terminal or issues, in another manner, an instruction to trigger an automatic calibration function of the dual-light camera (for example, an option in an APP of a mobile phone). A processor in the dual-light camera automatically starts to perform calibration. In an embodiment of the present invention, the user-friendly automatic calibration further includes a calibration wall. A temperature of the calibration frame is higher than a temperature of the calibration wall. The calibration wall is perpendicular to the dual-light camera (for example, the dual-light lens). In addition, the wall has single brightness, a single color, and a consistent temperature. The calibration wall is independently selected by the user. The calibration wall can be a solid color wall or background in the user's life. The temperature of the calibration wall is lower than the temperature of the calibration frame. The calibration frame is disposed in front of the calibration wall. A thermal imaging image including a first calibration frame image and a visible light image including a second calibration frame image are respectively acquired.

Step S402: Acquire first position information of the first calibration frame image in the thermal imaging image and second position information of the second calibration frame in the visible light image, where the first position information includes a width, a height and coordinates of the first calibration frame image in the thermal imaging image, and the second position information includes a width, a height and coordinates of the second calibration frame in the visible light image;

In an embodiment of the present invention, the first position information and the second position information are acquired in the following manner performing image processing on the thermal imaging image; and extracting, by using an edge detection algorithm, edges of the thermal imaging image and the visible light image after the image processing, so as to obtain the first position information and the second position information.

The image processing includes at least one of image denoising or contrast enhancement.

In an embodiment of the present invention, as shown in FIG. 2, using a rectangular calibration frame as an example, by way of example and not limitation, if an upper left vertex of the thermal imaging image is set as an origin (0, 0), it is known that coordinates of the other three vertices of the entire image are ($w_r$, 0), ($w_r$, $h_r$) and (0, $h_r$) clockwise in turn. $h_r$ is a height of the thermal imaging image. $w_r$ is a width of the thermal imaging image. Image recognition is performed. The thermal imaging image is subjected to denoising and contrast enhancement and then, is subjected to edge extraction (for example, an existing mature edge detection extraction operator, Canny operator, can be used to implement edge extraction). Edge points are connected to form an edge graph (a process of image recognition in the related art is not specifically described in the present invention), so that coordinates of vertices of the calibration frame are obtained. Further, a width and a height of the calibration frame can be obtained according to distances between the coordinates. Therefore, the processor 400 obtains coordinates (x0, y0) of an upper left corner vertex, coordinates $(x_{0r}, y_0)$ of an upper right corner, and coordinates $(x_0, y_{0b})$ of a lower left corner of the calibration frame, and at the same time, calculates a width $w_0=x_{0r}-x_0$ of the first calibration frame image in the thermal imaging image and a height $h_0=y_{0b}-y_0$ of the first calibration frame image in the thermal imaging image.

In an embodiment of the present invention, as shown in FIG. 3, by way of example and not limitation, an upper left vertex of the visible light image is set as an origin (0, 0). Image recognition is performed. For example, the visible light image is subjected to denoising, contrast enhancement and edge extraction. Edge points are connected to form an edge graph (a process of image recognition in the related art is not specifically described in the present invention). Finally, coordinates of vertices of the calibration frame are obtained. Further, a width and a height can be obtained through subtraction between the coordinates. Therefore, for example, coordinates $(x_1, y_1)$ of an upper left vertex, coordinates $(x_{1r}, y_1)$ of an upper right corner and coordinates $(x_1, y_{1b})$ of a lower left corner of the calibration frame in the visible light image are obtained. A width $w_1=x_{1r}-x_1$ of the second calibration frame image in the visible light image and a height $h_1=y_{1b}-y_1$ of the second calibration frame image in the visible light image are calculated.

Step S403: Generate calibration parameters according to the first position information and the second position information, where the calibration parameters include a width, a height and coordinates of a thermal imaging image synthesized in the visible light image.

Using coordinates in FIG. 2 and FIG. 3 as an example, the calibration parameters include coordinates of an upper left vertex of the thermal imaging image synthesized in the visible light image, and a width and a height of the scaled thermal imaging image synthesized in the visible image. It is assumed that the coordinates of the upper left vertex of the thermal imaging image synthesized in the visible light image are (x, y), the width is w and the height is h. Because the ratio between the calibration frame and the entire thermal imaging image is constant, there are:

$$\frac{w}{w_1} = \frac{w_r}{w_0} => w = \frac{w_r w_1}{w_0} \quad (1)$$

$$\frac{h}{h_1} = \frac{h_r}{h_0} => h = \frac{h_r h_1}{h_0} \quad (2)$$

$$\frac{x_1 - x}{w_1} = \frac{x_0}{w_0} => x = x_1 - \frac{w_1 x_0}{w_0} \quad (3)$$

$$\frac{y_1 - y}{h_1} = \frac{y_0}{h_0} => y = y_1 - \frac{h_1 y_0}{h_0} \quad (4)$$

Therefore, the calibration parameters—a width w, a height h and coordinates of an upper left vertex (x, y) of the thermal imaging image synthesized in the visible light image—can be obtained. In addition, coordinates of other vertices can further be calculated, which are (x+w, y), (x+w, y+h) and (x, y+h) clockwise in turn.

Step S404: Adjust, according to the calibration parameters, a position of the thermal imaging image synthesized in the visible light image in the visible light image.

In an embodiment of the present invention, the principle that a ratio of a calibration frame image in a thermal imaging image is unchanged in dual-light imaging fusion is utilized to resolve the problem that formed images photographed by a dual-light camera or a plurality of sensors cannot be fused or have an error due to a physical deviation.

Thus, the embodiments of the present invention provide a factory automatic calibration method and a user-friendly automatic calibration method, to simply and reliably resolve the problem that jointly generated and displayed images cannot be completely fused or seamlessly concatenated due to different physical positions and angles of a plurality of sensors. In addition, during the user's use, once finding the problem that images cannot be fused or there is an error, the user's automatic calibration instruction can be triggered to resolve the problem that jointly generated and displayed images cannot be completely fused or seamlessly concatenated due to a relative physical position change and different angles of the plurality of sensors during use, which is easy to operate and greatly improves the user experience.

Figure 5:
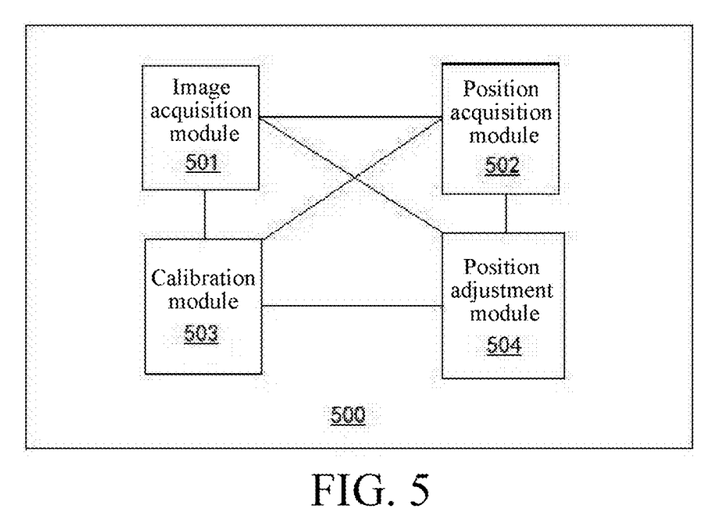
FIG. 5 is a structural diagram of an imaging calibration apparatus for a dual-light camera according to an embodiment of the present invention.

The embodiments of the present invention further provide a computer-readable storage medium. A person of ordinary skill in the art may understand that all or some of the processes in the methods of the foregoing embodiments may be implemented by a computer program instructing relevant hardware. The program may be stored in a computer-readable storage medium. When executed by one or more processors, one or more programs may include processes of the foregoing embodiments. The storage medium may be a magnetic disc, an optical disc, a read-only memory (ROM), a random access memory (RAM), or the like. The storage medium and the one or more processors are included in a mobile control terminal.

as shown in FIG. 5, the embodiments of the present invention further provide an imaging calibration apparatus for a dual-light camera 500, the apparatus 500 including: an image acquisition module 501, a position acquisition module 502, a calibration module 503 and a position adjustment module 504, and the modules are communicably connected.

The image acquisition module 501 is configured to acquire a thermal imaging image including a first calibration frame image and a visible light image including a second calibration frame image, where the first calibration frame image and the second calibration frame image are respectively images of a same calibration frame acquired by the image acquisition module.

The acquired thermal imaging image and visible light image are fused in a picture-in-picture manner to form a double-light image. After the thermal imaging image and the visible light image are combined according to a specific ratio, calibration is required. Generally, the calibration may be performed using a calibration frame.

The calibration frame is artificially selected. An object selected as the calibration frame needs to have a definite shape and a heating region overlapping a visible light region. This is to ensure that a heating part and a visible light part are consistent, so that a first calibration frame image and a second calibration frame image photographed by the thermal imaging camera and the visible light camera are the same except for pixel sizes, scale sizes or colors that may be different. If heating is uneven or only a specific region heats, a calibration frame image in an image acquired by the thermal imaging camera is completely different from a calibration frame image in an image acquired by the visible light camera. In this case, since variables cannot be controlled, the calibration frame cannot achieve a reference effect as a calibration frame. Therefore, the calibration frame needs to have a definite shape and a heating region overlapping a visible light region. In an embodiment of the present invention, the calibration frame is a rectangular heating frame. In addition, each edge of the calibration frame is parallel to a corresponding edge of the thermal imaging image and a corresponding edge of the visible light image. Moreover, the larger the area ratio of the calibration frame occupied by the thermal imaging image, the more accurate the calibration result.

The position acquisition module 502 is configured to acquire first position information of the first calibration frame image in the thermal imaging image and second position information of the second calibration frame in the visible light image, where the first position information includes a width, a height and coordinates of the first calibration frame image in the thermal imaging image, and the second position information includes a width, a height and coordinates of the second calibration frame in the visible light image.

In an embodiment of the present invention, the position acquisition module 502 is further configured to perform image processing on the thermal imaging image; and extract, by using an edge detection algorithm, edges of the thermal imaging image and the visible light image after the image processing, so as to obtain the first position information and the second position information. The image processing includes at least one of image denoising or contrast enhancement.

In an embodiment of the present invention, as shown in FIG. 2, using a rectangular calibration frame as an example, by way of example and not limitation, if an upper left vertex of the thermal imaging image is set as an origin (0, 0), it is known that coordinates of the other three vertices of the entire image are ($w_r$, 0), ($w_r$, $h_r$) and (0, $h_r$) clockwise in turn. $h_r$ is a height of the thermal imaging image. $w_r$ is a width of the thermal imaging image. Image recognition is performed. The thermal imaging image is subjected to denoising and contrast enhancement, and then, is subjected to edge extraction (for example, an existing mature edge detection extraction operator, Canny operator, can be used to implement edge extraction). Edge points are connected to form an edge graph (a process of image recognition in the related art is not specifically described in the present invention), so that obtain coordinates of vertices of the calibration frame are obtained. Further, a width and a height of the calibration frame can be obtained according to distances between the coordinates. Therefore, the processor 400 obtains coordinates (x0, y0) of an upper left vertex, coordinates ($x_{0r}$, $y_0$) of an upper right corner and coordinates ($x_0$, $y_{0b}$) of a lower left corner of the calibration frame, and at the same time, calculates a width $w_0=x_{0r}-x_0$ of the first calibration frame image in the thermal imaging image and a height $h_0=y_{0b}-y_0$ of the first calibration frame image in the thermal imaging image.

In an embodiment of the present invention, as shown in FIG. 3, by way of example and not limitation, an upper left vertex of the visible light image is set as an origin (0, 0). Image recognition is performed. For example, the visible light image is subjected to denoising, contrast enhancement and edge extraction. Edge points are connected to form an edge graph (a process of image recognition in the related art is not specifically described in the present invention). Finally, coordinates of vertices of the calibration frame are obtained. Further, a width and a height can be obtained through subtraction between the coordinates. Therefore, for example, coordinates ($x_1$, $y_1$) of an upper left vertex, coordinates ($x_{1r}$, $y_1$) of an upper right corner and coordinates ($x_1$, $y_{1b}$) of a lower left corner of the calibration frame in the visible light image are obtained. A width $w_1=x_{1r}-x_1$ of the second calibration frame image in the visible light image and a height $h_1=y_{1b}-y_1$ of the second calibration frame image in the visible light image are calculated.

The calibration module 503 is configured to generate calibration parameters according to the first position information and the second position information, where the calibration parameters include a width, a height and coordinates of a thermal imaging image synthesized in the visible light image.

In an embodiment of the present invention, coordinates in FIG. 2 and FIG. 3 are used as an example.

The calibration parameters include coordinates of an upper left vertex of the thermal imaging image synthesized in the visible light image, and a width and a height of the thermal imaging image. It is assumed that the coordinates of the upper left vertex of the thermal imaging image synthesized in the visible light image are (x, y), the width is w and the height is h. Because the ratio between the calibration frame and the entire thermal imaging image is constant, there are:

$$\frac{w}{w_1} = \frac{w_r}{w_0} => w = \frac{w_r w_1}{w_0} \qquad (1)$$

$$\frac{h}{h_1} = \frac{h_r}{h_0} => h = \frac{h_r h_1}{h_0} \qquad (2)$$

$$\frac{x_1 - x}{w_1} = \frac{x_0}{w_0} => x = x_1 - \frac{w_1 x_0}{w_0} \qquad (3)$$

$$\frac{y_1 - y}{h_1} = \frac{y_0}{h_0} => y = y_1 - \frac{h_1 y_0}{h_0} \qquad (4)$$

Therefore, the calibration parameters—a width w, a height h and coordinates of an upper left vertex (x, y) of the thermal imaging image synthesized in the visible light image—can be obtained. In addition, coordinates of other vertices can further be calculated, which are (x+w, y), (x+w, y+h) and (x, y+h) clockwise in turn.

The position adjustment module 504 is configured to adjust, according to the calibration parameters, a position of the thermal imaging image synthesized in the visible light image in the visible light image.

In an embodiment of the present invention, the principle that a ratio of a calibration frame in a thermal imaging image is unchanged in dual-light imaging fusion is utilized to resolve the problem that formed images photographed by a dual-light camera or a plurality of sensors cannot be fused or have an error due to a physical deviation.

The present invention provides an imaging calibration method for a dual-light camera. A calibration frame is configured for acquiring image positions of the calibration frame in thermal imaging image and visible light image respectively, to calibrate relative positions of the thermal imaging image and the visible light image, so that the dual-light camera or multi-sensor imaging can be free from impact of a physical displacement and an angle change, so that images photographed by two or more cameras or sensors can be combined, fused or seamlessly connected for display.

A person of ordinary skill in the art may understand that all or some of the steps in the foregoing method may be implemented by a program instructing relevant hardware. The program may be stored in a computer-readable storage medium, for example, a ROM, a magnetic disk, or an optical disc. Optionally, all or some of the steps of the foregoing embodiments may alternatively be implemented by using one or more integrated circuits. Correspondingly, the modules/units in the foregoing embodiments may be implemented in the form of hardware, or may be implemented in the form of a software functional module. The present invention is not limited to any particular form of combination of hardware and software.

The foregoing descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. An imaging calibration method for a dual-light camera, applicable to a dual-light camera, the dual-light camera comprising a thermal imaging camera and a visible light camera, the method comprising:
   acquiring a thermal imaging image comprising a first calibration frame image and a visible light image comprising a second calibration frame image, wherein the first calibration frame image and the second calibration frame image are images of a same calibration frame respectively photographed by the thermal imaging camera and the visible light camera;
   acquiring first position information of the first calibration frame image in the thermal imaging image and second position information of the second calibration frame in the visible light image, wherein the first position information comprises a width, a height and coordinates of the first calibration frame image in the thermal imaging image, and the second position information comprises a width, a height and coordinates of the second calibration frame in the visible light image;
   generating calibration parameters according to the first position information and the second position information, wherein the calibration parameters comprise a width, a height and coordinates of a thermal imaging image synthesized in the visible light image; and
   adjusting, according to the calibration parameters, a position of the thermal imaging image synthesized in the visible light image in the visible light image;
   wherein the generating calibration parameters according to the first position information and the second position information comprises:
   generating the calibration parameters by using the following formulas:

$$w = \frac{w_r w_1}{w_0}$$

$$h = \frac{h_r h_1}{h_0}$$

$$x = x_1 - \frac{w_1 x_0}{w_0}$$

$$y = y_1 - \frac{h_1 y_0}{h_0}$$

wherein w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible light image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

2. The imaging calibration method according to claim 1, wherein the calibration frame is a rectangular heating frame.

3. The imaging calibration method according to claim 1, wherein the acquiring first position information of the first calibration frame image in the thermal imaging image and second position information of the second calibration frame in the visible light image comprises:
   performing image processing on the thermal imaging image and the visible light image respectively; and
   extracting, by using an edge detection algorithm, edges of the thermal imaging image and the visible light image after the image processing, so as to obtain the first position information and the second position information.

4. The imaging calibration method according to claim 3, Wherein the image processing comprises at least one of image demising or contrast enhancement.

5. A dual-light camera, comprising:
   a thermal imaging camera, configured to acquire a thermal imaging image comprising a first calibration frame image;
   a visible light camera, configured to acquire a visible light image comprising a second calibration frame image, wherein the first calibration frame image and the second calibration frame image are images of a same calibration frame respectively photographed by the thermal imaging camera and the visible light camera; and
   at least one processor, communicably connected to the thermal imaging camera and the visible light camera, wherein the at least one processor is configured to:
   acquire first position information of the first calibration frame image in the thermal imaging image and second position information of the second calibration frame in the visible light image, wherein the first position information comprises a width, a height and coordinates of the first calibration frame image in the thermal imaging image, and the second position information comprises a width, a height and coordinates of the second calibration frame in the visible light image;

generate calibration parameters according to the first position information and the second position information, wherein the calibration parameters comprise a width, a height and coordinates of a thermal imaging image synthesized in the visible light image; and adjust, according to the calibration parameters, a position of the thermal imaging image synthesized in the visible light image in the visible light image;

wherein the processor is configured to:

generate the calibration parameters by using the following formulas:

$$w = \frac{w_r w_1}{w_0}$$

$$h = \frac{h_r h_1}{h_0}$$

$$x = x_1 - \frac{w_1 x_0}{w_0}$$

$$y = y_1 - \frac{h_1 y_0}{h_0}$$

wherein w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible light image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

6. The dual-light camera according to claim 5, wherein the processor is further configured to:

perform image processing on the thermal imaging image and the visible light image respectively; and extract, by using an edge detection algorithm, edges of the thermal imaging image and the visible light image after the image processing, so as to obtain the first position information and the second position information.

7. The dual-light camera according to claim 6, wherein the image processing comprises at least one of image denoising or contrast enhancement.

8. An imaging calibration apparatus for a dual-light camera, comprising at least one processor; and a memory communicably connected to the at least one processor, wherein the memory stores instructions executable by the at least one processor, the instructions being executed by the at least one processor to enable the at least one processor to:

acquire a thermal imaging image comprising a first calibration frame image and a visible light image comprising a second calibration frame image, wherein the first calibration frame image and the second calibration frame image are respectively images of a same calibration frame;

acquire first position information of the first calibration frame image in the thermal imaging image and second position information of the second calibration frame in the visible light image, wherein the first position information comprises a width, a height and coordinates of the first calibration frame image in the thermal imaging image, and the second position information comprises a width, a height and coordinates of the second calibration frame in the visible light image;

generate calibration parameters according to the first position information and the second position information, wherein the calibration parameters comprise a width, a height and coordinates of a thermal imaging image synthesized in the visible light image; and adjust, according to the calibration parameters, a position of the thermal imaging image synthesized in the visible light image in the visible light image;

wherein the processor to is further configured to:

generate the calibration parameters by using the following formulas:

$$w = \frac{w_r w_1}{w_0}$$

$$h = \frac{h_r h_1}{h_0}$$

$$x = x_1 - \frac{w_1 x_0}{w_0}$$

$$y = y_1 - \frac{h_1 y_0}{h_0}$$

wherein w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

9. The apparatus according to claim 8, wherein the calibration frame is a rectangular heating frame.

10. The apparatus according to claim 8, wherein the processor is further configured to:
perform image processing on the thermal imaging image and the visible light image respectively; and
extract, by using an edge detection algorithm, edges of the thermal imaging image and the visible light image after the image processing, so as to obtain the first position information and the second position information.

11. The apparatus according to claim 10, wherein the image processing comprises at least one of image denoising or contrast enhancement.

12. A non-transitory computer readable memory medium storing program instructions executable by processing circuitry to cause a processor to:
acquire a thermal imaging image comprising a first calibration frame image and a visible light image comprising a second calibration frame image, wherein the first calibration frame image and the second calibration frame image are respectively images of a same calibration frame;
acquire first position information of the first calibration frame image in the thermal imaging image and second position information of the second calibration frame in the visible light image, wherein the first position information comprises a width, a height and coordinates of the first calibration frame image in the thermal imaging image, and the second position information comprises a width, a height and coordinates of the second calibration frame in the visible light image;
generate calibration parameters according to the first position information and the second position information, wherein the calibration parameters comprise a width, a height and coordinates of a thermal imaging image synthesized in the visible light image; and
adjust, according to the calibration parameters, a position of the thermal imaging image synthesized in the visible light image in the visible light image;
wherein the program instructions are further executable to:
generate the calibration parameters by using the following formulas:

$$w = \frac{w_r w_1}{w_0}$$

$$h = \frac{h_r h_1}{h_0}$$

$$x = x_1 - \frac{w_1 x_0}{w_0}$$

$$y = y_1 - \frac{h_1 y_0}{h_0}$$

wherein w is a width of the thermal imaging image synthesized in the visible light image, $w_r$ is a width of the thermal imaging image, $w_0$ is a width of the first calibration frame image in the thermal imaging image, $w_1$ is a width of the second calibration frame image in the visible light image, h is a height of the thermal imaging image synthesized in the visible light image, $h_r$ is a height of the thermal imaging image, $h_1$ is a height of the second calibration frame image in the visible light image, $h_0$ is a height of the first calibration frame image in the thermal imaging image, x is a horizontal coordinate of an upper left vertex of the thermal imaging image synthesized in the visible light image, $x_1$ is a horizontal coordinate of an upper left vertex of the second calibration frame image in the visible light image, $x_0$ is a horizontal coordinate of an upper left vertex of the first calibration frame image in the thermal imaging image, y is a vertical coordinate of an upper left vertex of the thermal imaging image synthesized in the visible light image, $y_1$ is a vertical coordinate of an upper left vertex of the second calibration frame image in the visible light image, and $y_0$ is a vertical coordinate of an upper left vertex of the first calibration frame image in the thermal imaging image.

13. The non-transitory memory medium according to claim 12, wherein the calibration frame is a rectangular heating frame.

14. The non-transitory memory medium according to claim 12, wherein the program instructions are further executable to:
perform image processing on the thermal imaging image and the visible light image respectively; and
extract, by using an edge detection algorithm, edges of the thermal imaging image and the visible light image after the image processing, so as to obtain the first position information and the second position information.

15. The non-transitory memory medium according to claim 14, wherein the image processing comprises at least one of image denoising or contrast enhancement.

* * * * *